United States Patent [19]

Schramm et al.

[11] Patent Number: 4,983,562

[45] Date of Patent: Jan. 8, 1991

[54] HIGH ACTIVITY CATALYST SYSTEM FOR THE PRODUCTION OF PROPYLENE POLYMERS

[75] Inventors: Kathleen D. Schramm, Somerville; Frederick J. Karol, Belle Mead, both of N.J.

[73] Assignee: Union Carbide Chemicals and Plastics Company Inc., Danbury, Conn.

[21] Appl. No.: 437,816

[22] Filed: Nov. 17, 1989

[51] Int. Cl.$^5$ .............................................. C08F 4/646
[52] U.S. Cl. .................................. 502/112; 502/113; 526/114
[58] Field of Search ................................ 502/112, 113

[56] References Cited

U.S. PATENT DOCUMENTS 3,812,089  5/1974  Tashiro et al. ...................... 260/93.7
4,317,897  3/1982  Herrman et al. ................ 502/113 X
4,524,195  6/1985  Martin ............................. 502/113 X
4,659,685  4/1987  Coleman et al. ..................... 502/113

Primary Examiner—Patrick P. Garvin
Attorney, Agent, or Firm—Saul R. Bresch

[57] ABSTRACT

A catalyst system comprising:
(i) a catalyst precursor, which includes: magnesium; titanium; a halogen, which is chlorine, bromine, or iodine, or a mixture thereof; one or two inside electron donors; and a cerium (IV) compound;
(ii) a hydrocarbylaluminum cocatalyst; and
(iii) a selectivity control agent wherein the atomic ratio of aluminum to titanium is in the range of about 5 to about 300 and the molar ratio of aluminum to selectivity control agent is in the range of about 0.1 to about 100.

29 Claims, No Drawings

HIGH ACTIVITY CATALYST SYSTEM FOR THE PRODUCTION OF PROPYLENE POLYMERS

TECHNICAL FIELD

This invention relates to a catalyst system, which exhibits a high order of activity in propylene polymerization.

BACKGROUND ART

In U.S. patent application Ser. No. 051,853 filed on May 19, 1987, a catalyst system is provided for producing stereo regular polymers. More particularly, it was found that polymers having an isotactic index of at least 96 percent could be prepared in high yield at high production rates by polymerizing an alpha-olefin in a low pressure gas phase fluidized bed process at temperatures in excess of 50° C. employing a catalyst system comprising (i) a catalyst precursor, which includes magnesium, titanium, halogen, and an inside electron donor, i.e., a polycarboxylic acid ester containing two coplanar ester groups attached to adjacent carbon atoms; (ii) a hydrocarbylaluminum cocatalyst; and (iii) an outside electron donor or selectivity control agent, i.e., a silicon compound containing a silicon-oxygen-carbon linkage wherein the atomic ratio of aluminum to silicon is in the range of about 0.5:1 to about 100:1 and the atomic ratio of aluminum to titanium is in the range of about 5:1 to about 300:1. An alternative catalyst system uses an outside electron donor similar to the inside electron donor, i.e., the polycarboxylic acid ester described above, to the same end.

Although the gas phase activity of these catalyst systems is more than satisfactory, certain end uses for propylene based resins require much lower resin ash values than are obtained with this catalyst system. Thus, a more active catalyst system would be desirable, particularly in the production of polymer fibers, film, and medical packaging.

DISCLOSURE OF THE INVENTION

An object of this invention, therefore, is to provide a catalyst system having enhanced activity.

Other objects and advantages will become apparent hereinafter.

According to the present invention, a catalyst system has been discovered comprising:

(i) a catalyst precursor, which includes: magnesium; titanium; a halogen, which is chlorine, bromine, or iodine, or a mixture thereof; one or two inside electron donors; and a cerium (IV) compound;
(ii) a hydrocarbylaluminum cocatalyst; and
(iii) a selectivity control agent, wherein the atomic ratio of aluminum to titanium is in the range of about 5 to about 300 and the molar ratio of aluminum to selectivity control agent is in the range of about 0.1 to about 100.

DETAILED DESCRIPTION

The catalyst precursor can be prepared by halogenating a magnesium compound of the formula MgRR' wherein R is an alkoxide or aryloxide group and R. is an alkoxide or aryloxide group or a halogen with a halogenated tetravalent titanium compound containing at least two halogen atoms in the presence of a halohydrocarbon and one or more electron donors such as ethyl benzoate and a hydrocarbyl phthalate. The alkoxide groups can contain 1 to 8 carbon atoms and the aryloxide groups 6 to 10 carbon atoms. The halogen can be chlorine, bromine, or iodine.

Suitable magnesium compounds are magnesium diethoxide, magnesium diisopropoxide, magnesium di-n-butoxide, magnesium diphenoxide, magnesium dinaphthoxide, ethoxy magnesium isobutoxide, ethoxy magnesium phenoxide, naphthoxy magnesium isoamyloxide, ethoxy magnesium bromide, isobutoxy magnesium chloride, phenoxy magnesium iodide, cumyloxy magnesium bromide, and naphthoxy magnesium chloride.

The halogenated tetravalent titanium compound contains at least two halogen atoms and can have up to two alkoxy and/or aryloxy groups. Examples are $TiCl_4$, $TiBr_4$, diethoxy titanium dibromide, isopropoxy titanium triiodide, dihexoxy titanium dichloride, and phenoxy titanium trichloride.

The halohydrocarbon, while preferably aromatic, can be aliphatic or alicyclic. Suitable halohydrocarbons are chlorobenzene, bromobenzene, dichlorobenzene, dichlorodibromobenzene, chlorotoluene, dichlorotoluene, chloronaphthalene, dibromomethane, trichloromethane, 1,2-dichloroethane, trichloroethane, dichlorofluoroethane, hexachloroethane, trichloropropane, chlorobutane, dichlorobutane, chloropentane, trichlorofluorooctane, tetrachloroisooctane, dibromodifluorodecane, dibromocyclobutane, and trichlorocyclohexane.

The halogenated tetravalent titanium compound and the halohydrocarbon preferably contain no more than 12 carbon atoms.

Two inside electron donors are preferably used in the preparation of the catalyst precursor. Suitable inside electron donors are mono- or polycarboxylic acid esters such as ethyl and methyl benzoate, p-methoxy ethyl benzoate, p-ethoxy methyl benzoate, p-ethoxy ethyl benzoate, ethyl acrylate, methyl methacrylate, ethyl acetate, p-chloro ethyl benzoate, p-amino hexyl benzoate, isopropyl naphthenate, n-amyl toluate, ethyl cyclohexanoate, propyl pivalate, diethyl-1,2-fluorenedicarboxylate, diisopropyl-1-,2-ferrocenedicarboxylate, cis-diisobutyl-cyclobutane-1,2-dicarboxylate, endo-dissobutyl-5-norbornene-2,3-dicarboxylate, and endo-diisobutylbicyclo[2.2.2]oct-5-ene-2,-3-dicarboxylate, diisobutyl maleate, diisoamyl citraconate, hydrocarbyl phthalates such as dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, dineopentyl phthalate, di-2-ethylhexyl phthalate, and di-2-ethyldecyl phthalate. These inside electron donors can also serve as outside electron donors or selectivity control agents.

Halogenation of the magnesium compound is generally effected by employing an excess of a halogenated titanium compound, about 2 mols to about 100 mols of titanium compound per mole of magnesium compound. The halohydrocarbon is employed in an amount sufficient to dissolve the titanium compound and the ester, and to adequately disperse the solid, insoluble magnesium compound.

The molar ratios of the components used in preparing the catalyst are about as follows:

| Components | Broad Range | Preferred Range |
| --- | --- | --- |
| Ce/Ti | 0.0001 to 0.09 | 0.001 to 0.02 |

-continued

| Components | Broad Range | Preferred Range |
|---|---|---|
| ED/Mg | 0.005 to 2 | 0.01 to 1 |
| ED/Ti | 0.0005 to 2 | 0.001 to 0.1 |
| Mg/halohydrocarbon | 0.005 to 2 | 0.01 to 1 |
| TiCl/OEt | 4 to 100 | 4 to 20 |

The halogenation of the magnesium compound can be carried out in a temperature range of about 60° C. to about 150° C. over a period of about 0.1 to about 6 hours. The halogenated product is a solid material which can be isolated from the liquid reaction medium by filtration or decantation. After separation, it is treated one or more times with the titanium compound in the same molar ratio to remove residuals and maximize catalyst activity. The halohydrocarbon is usually employed during this treatment to dissolve the titanium compound and disperse the halogenated product. The treatment is preferably carried out twice, the second treatment being in the presence of a polycarboxylic acid halide containing two coplanar acid groups attached to adjacent carbon atoms. About 5 to about 200 millimols of acid halide are generally employed per gram atom of magnesium. Suitable acid halides include phthaloyl dichloride, 2,3-naphthalene di-carboxylic acid dichloride, endo-5-norbornene-2,3-dicarboxylic acid dichloride, maleic acid dichloride, and citraconic acid dichloride.

After the solid halogenated product has been treated one or more times with additional halogenated tetravalent titanium compound, it is separated from the liquid reaction medium, washed with an inert hydrocarbon to remove unreacted titanium compounds, and dried. The washed product suitably has a titanium content of about 0.5 percent by weight to about 6.0 percent by weight. The atomic ratio of titanium to magnesium is in the range of about 0.01:1 to about 0.2:1. Each inside electron donor is present in a molar ratio of electron donor to magnesium of about 0.005:1 to about 10:1. The dried solid product is in powdered form, and is considered to be the catalyst precursor.

The powdered precursor is then treated with a solution of a cerium (IV) compound. This post-treatment of the precursor can be accomplished by slurrying the precursor in a hydrocarbon solvent such as toluene. The dissolution environment is maintained substantially free from air and moisture. A suspension of cerium acetylacetonate in the same hydrocarbon solvent is added to the precursor solution and the mixture is agitated for about an hour. A reaction takes place between the cerium (IV) compound and the precursor, and the modified precursor is then filtered under an inert atmosphere, washed with one hydrocarbon solvent, such as toluene, and then another, such as hexane, and dried.

While the preferred cerium (IV) compound is cerium (IV) acetylacetonate, other cerium (IV) compounds, usually salts, such as cerium tetrafluoride, cerium iodate, and cerium trifluoroacetylacetonate can be used. Whatever the cerium compound selected, the cerium in the compound must have a valence of 4. THe cerium compound is preferably dehydrated, and in as pure a state as possible.

The hydrocarbyl aluminum cocatalyst can be represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be alike or different; and each R, which is a hydrocarbyl radical, has 1 to 20 carbon atoms, and preferably 1 to 10 carbon atoms. Further, each alkyl radical can be straight or branched chain and such hydrocarbyl radical can be a mixed radical, i.e., the radical can contain alkyl, aryl, and/or cycloalkyl groups. Examples of suitable radicals are: methyl, ethyl, propyl, isopropyl, butyl, isobutyl, tert-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, dodecyl, phenyl, phenethyl, methoxyphenyl, benzyl, tolyl, xylyl, naphthyl, naphthal, methylnaphthyl, cyclohexyl, cycloheptyl, and cyclooctyl.

Examples of suitable hydrocarbyl aluminum compounds are as follows: triisobutylaluminum, trihexylaluminum, di-isobutylaluminum hydride, dihexylaluminum hydride, isobutylaluminum dihydride, hexylaluminum dihydride, di-isobutylhexylaluminum, isobutyl dihexylaluminum, trimethylaluminum, triethylaluminum, tripropyaluminum, triisopropyaluminum, tri-n-butylaluminum, trioctylaluminum, tridecylaluminum, tridodecylaluminum, tribenzylaluminum, triphenylaluminum, trinaphthyaluminum, and tritolylaluminum. The preferred hydrocarbyl aluminums are triethylaluminum, triisobutylaluminum, trihexylaluminum, di-isobutylaluminum hydride, and dihexylaluminum hydride.

In addition to the electron donors mentioned above, the selectivity control agent can be a silicon compound. The silicon compounds include compounds having the formula $R_aSiY_bX_c$ wherein R is a hydrocarbon radical having 1 to 20 carbon atoms; Y is -OR or -OCOR; and X is hydrogen, chlorine, bromine, or iodine; each R and Y are alike or different; a is an integer from 0 to 3; b is an integer from 1 to 4; c is 0 or 1; and $a+b+c=4$. R can be substituted or unsubstituted. Silicon compounds containing Si-O-Si groups can also be employed provided that at least one Si-O-C group is present. Examples of useful silicon compounds are diphenyldimethoxysilane, n-propyltrimethoxysilane, di-tert-butyldimethoxysilane, diphenyldiisobutoxysilane, diisobutyldimethoxysilane, and dimethyldiethoxysilane.

The catalyst system is advantageously used in the gas phase polymerization of propylene to provide the homopolymer or the gas phase copolymerization of propylene with various comonomers. The gas phase polymerization or copolymerization is preferably conducted in one or more fluidized bed reactions such as that described in U.S. Pat. No. 4,482,687.

In this specification, the term "copolymer" is considered to mean a polymer based on two or more comonomers. The additional comonomers can be ethylene or alpha- olefins having 4 to 12 carbon atoms, or conjugated or non-conjugated dienes containing 5 to 25 carbon atoms. Useful alpha-olefins preferably do not contain any branching on carbon atoms closer than two carbon atoms removed from the double bond. Examples of suitable alpha-olefins include 1-butene, 1-hexene, 4-methylpentene-1, 1-heptene, and 1-octene. Examples of the dienes are 1,4-pentadiene, 1,4-hexadiene, 1,5-hexadiene, dicyclopentadiene, cyclohexadiene, 1-vinyl-1-cyclopentene, and the alkylbicyclononadienes, indenes, and norbornenes. Ethylidene norbornene is an example of the latter. The non-conjugated dienes are preferred. The dienes are usually the third comonomer.

In the copolymer, the portion attributed to propylene can be in the range of about 80 to about 99.5 percent by weight based on the weight of the copolymer and is preferably in the range of about 90 to about 99.5 percent by weight; the portion attributed to the second comonomer, usually an alpha-olefin, can be in the range of about 0.5 to about 20 percent by weight and is preferably in the range of about 0.5 to about 10 percent by weight; and the portion attributed to other comonomers, if any, can be in the range of about 0.5 to about 20 percent by weight. All percentages are based on the weight of the copolymer.

The fluidized bed, or other gas phase, reactor can be operated at a temperature in the range of about 50° C. to about 150° C. and is preferably operated at a temperature in the range of about 60° C. to about 90° C. The operating pressure can be in the range of about 200 psig to about 650 psig or higher and is preferably about 250 psig to about 550 psig. The partial pressure of the propylene can be in the range of about 50 to about 600 psi and is preferably about 150 to about 500 psi. The total partial pressure of the other comonomers can be in the range of about 1 to 100 psi. The superficial gas velocity, which can be calculated by measuring cycle gas flow, is, generally, maintained in the range of about 0.1 to about 5 feet per second and is preferably in the range of about 0.5 to about 3 feet per second. The superficial gas velocity is preferably used together with a slow transition in order to optimize the results.

The residence time of the propylene and the comonomers, if any, in the reactor can be in the range of about 1 to about 20 hours and is preferably about 2 to about 6 hours. The velocity of the fluidizing gas can be in the range of about 0.1 to about 5.0 feet per second or higher and is preferably about 0.5 to about 2.0 feet per second. Hydrogen or another chain transfer agent can be used in the process. The molar ratio of hydrogen to the comonomers used in the fluidized bed reactor can be in the range of about 0.0005:1 to about 0.2:1 and is preferably in the range of about 0.01:1 to about 0.1:1. This translates into a hydrogen partial pressure in the range of about 0.1 psi to about 200 psi and preferably about 0.5 psi to about 50 psi. The balance of the operating pressure utilized in the reactor, i.e., after the partial pressure of propylene, and, if used, other comonomers and the hydrogen partial pressure are considered, can be made up by using an inert gas such as nitrogen.

Where it is desired to produce, for example, a propylene/ethylene random copolymer only, one fluidized bed reactor is used. In the case of impact grade copolymers, a second fluidized bed reactor is needed.

In the polymerization process, the components of the catalyst system are generally maintained in an amount such that the molar ratio of aluminum in the cocatalyst to the selectivity control agent is about 0.5 to about 100, and preferably is about 1 to about 50, and the atomic ratio of aluminum in the cocatalyst to titanium in the solid catalyst component is about 5 to 300, and is preferably about 10 to about 200.

It is found that the treatment of a particular catalyst system as described above with a cerium (IV) compound substantially improves resin productivity while maintaining constant product properties such as isotactic index. It is noted that the cerium (IV) treatment also results in improved high temperature catalyst activity.

Patent applications and patents referred to in this specification are incorporated by reference herein.

The invention is illustrated by the following examples.

EXAMPLES 1 TO 19

To a solution of 70 milliliters of titanium tetrachloride (120 grams, 0.64 mol) in 3.7 liters of chlorobenzene are added, in succession, 180 milliliters of diisobutyl phthalate (187 grams, 0.67 mol), 590 grams (5.2 mols) of magnesium diethoxide, and a solution of 4.7 liters of titanium tetrachloride (8100 grams, 43 mols) in 1.2 liters of chlorobenzene, and 15 grams (0.10 mol) of ethyl benzoate. A temperature of 20° C. to 25° C. is maintained during these additions. The resulting mixture is then heated to 110° C. with stirring, the temperature being maintained for 1 hour. At the end of this time, the mixture is filtered while hot. A solid material is collected.

The solid material is then slurried in a solution of 4.7 liters of titanium tetrachloride (8100 grams, 43 mols) in 1.2 liters of chlorobenzene at room temperature. A solution of 45 grams (0.22 mol) of phthaloyl dichloride in 3.7 liters of chlorobenzene is added to the slurry at room temperature, and the resulting slurry is then heated to 110° C. with stirring, the temperature being maintained for 30 minutes. At the end of this time, the mixture is filtered while hot. A solid material is collected.

The solid material is reslurried in a solution of 4.7 liters of titanium tetrachloride (8100 grams, 43 mols) in 1.2 liters of chlorobenzene at room temperature. An additional 3.7 liters of chlorobenzene is then added to the slurry at room temperature, and the resulting slurry is heated to 110° C. with stirring, the temperature being maintained in 30 minutes. At the end of this time, the mixture is filtered while hot. A solid material is collected.

The solid material is reslurried once again in a solution of 4.7 liters of titanium tetrachloride (8100 grams, 43 mols) in 1.2 liters of chlorobenzene at room temperature. An additional 3.2 liters of chlorobenzene is then added to the slurry at room temperature, and the resulting slurry is heated to 110° C. with stirring, the temperature being maintained for 30 minutes. At the end of this time, the mixture is filtered while hot. The residue is washed 6 times with 500 milliliter portions of hexane at 25° C., and then dried under a nitrogen purge. The product weighs about 500 grams, is in the form of a powder, and is referred to as the catalyst precursor. The precursor contains 0.26 percent by weight ethyl benzoate and 9.5 percent by weight diisobutyl- phthalate, the percent by weight being based on the weight of the precursor.

From 2 to 70 grams of the precursor is post-treated with cerium (IV) acetylacetonate. In this case, the powdered precursor is slurried in toluene in an environment which is substantially free from air and moisture. A toluene suspension of cerium (IV) acetylacetonate is added at prescribed cerium/titanium atomic ratios and the mixture is agitated for one hour during which a reaction product is formed. The modified precursor is then filtered under an inert atmosphere, washed with one volume of toluene, then one volume of hexane, and dried.

The powdered precursor, unmodified or modified with the cerium (IV) salt is batch fed into a laboratory gas phase reactor. The bed is made up of particles of sodium chloride. The precursor is fed into the reactor as a 5 percent by weight dispersion in mineral oil. Simultaneously, and continuously, triethylaluminum cocatalyst as a 25 percent by weight solution in hexane and diphenyldimethoxysilane (selectivity control agent) as a 4 percent by weight solution in hexane are also added to the reactor.

Sufficient catalyst precursor, cocatalyst, and selectivity control agent are introduced into the reactor to maintain the following molar ratios of aluminum to selectivity control agent (SCA) and of triethylaluminum (TEAL) to titanium: TEAL/Ti=70 to 100:1; TEAL/SCA=1 to 20:1.

Propylene, hydrogen, and nitrogen are added. The partial pressure of propylene is 270 psi. The partial pressure of hydrogen is adjusted to control melt flow. The residence time is 2 hours.

The variables and results are reported in the Tables.

TABLE I

| Catalyst | Electron Donor (inside) | Ce/Ti (molar ratio) | Mg (%) | Ti (%) | Ce (ppm) |
|---|---|---|---|---|---|
| A | EB | — | 16.4 | 2.90 | <89 |
| B | EB | 0.001 | 17.9 | 2.99 | 193 |
| C | EB | 0.004 | 17.6 | 3.06 | 740 |
| C' | EB | 0.004 | 18.2 | 3.31 | 992 |
| D | IBP | — | 19.8 | 2.23 | <89 |
| E | IBP | 0.010 | 18.3 | 1.84 | 1341 |
| F | IBP | 0.020 | 19.6 | 1.94 | 1118 |
| G | IBP/EB | — | 17.8 | 2.05 | <86 |
| H | IBP/EB | 0.005 | 20.3 | 2.19 | 999 |
| I | IBP/EB | 0.010 | 19.0 | 2.04 | 1293 |
| I' | IBP/EB | 0.010 | 20.6 | 2.22 | 1892 |
| I" | IBP/EB | 0.010 | 15.8 | 1.91 | 1169 |
| J | IBP/EB | 0.020 | 18.8 | 2.02 | 2959 |

TABLE II

| Example | Catalyst | Temperature (°C.) | kg/g Ti | isotactic index | Al/SCA (molar ratio) | melt flow (g/10 min) |
|---|---|---|---|---|---|---|
| 1 | A | 67 | 264 | 98.4 | 1.6 | — |
| 2 | A | 67 | 216 | 96.8 | 1.6 | — |
| 3 | A | 67 | 316 | 95.0 | 2.5 | — |
| 4 | A | 67 | 334 | 91.0 | 3.5 | — |
| 5 | B | 67 | 512 | 94.0 | 2.5 | — |
| 6 | B | 67 | 390 | 95.8 | 2.5 | — |
| 7 | B | 67 | 475 | 97.7 | 2.8 | — |
| 8 | C' | 67 | 357 | 97.5 | 2.0 | — |
| 9 | C | 67 | 502 | 95.3 | 2.5 | — |
| 10 | C' | 67 | 503 | 91.5 | 2.6 | — |
| 11 | D | 67 | 642 | 97.0 | 7.0 | — |
| 12 | D | 67 | 631 | 96.6 | 12.0 | — |
| 13 | E | 67 | 722 | 98.1 | 7.0 | — |
| 14 | F | 67 | 769 | 97.5 | 7.0 | — |
| 15 | F | 67 | 734 | 97.3 | 11.0 | — |
| 16 | G | 67 | 549 | 96.0 | 10.0 | 5.1 |
| 17 | G | 67 | 554 | 91.4 | 14.0 | 17.8 |
| 18 | G | 67 | 562 | 97.0 | 11.5 | 13.1 |
| 19 | H | 67 | 785 | 97.2 | 7.0 | — |
| 20 | H | 67 | 727 | 96.7 | 11.0 | — |
| 21 | I" | 67 | 963 | 96.7 | 11.0 | 13.8 |
| 22 | I" | 67 | 1087 | 97.5 | 7.0 | 13.1 |
| 23 | I" | 67 | 985 | 95.0 | 7.0 | 7.6 |
| 24 | J | 67 | 731 | 97.4 | 11.0 | 13.7 |
| 25 | G | 110 | 160 | 90.6 | 13.0 | — |
| 26 | G | 110 | 187 | 95.4 | 8.6 | 3.9 |
| 27 | G | 110 | 198 | 94.6 | 7.0 | 9.6 |
| 28 | I | 110 | 328 | 97.0 | 8.6 | — |
| 29 | I | 110 | 453 | 96.2 | 7.2 | 3.4 |
| 30 | I' | 110 | 434 | 93.4 | 7.2 | 2.0 |
| 31 | I' | 110 | 446 | 90.8 | 10.0 | — |
| 32 | I" | 110 | 489 | 91.8 | 11.0 | — |

Notes to Tables:
1. EB = ethyl benzoate.
2. IBP = isobutyl phthalate.

Notes to Tables:
1. EB=ethyl benzoate.
2. IBP=isobutyl phthalate.
3. Ce/Ti=the molar ratio of cerium compound to titanium if the precursor is cerium modified.
4. Mg=the percent by weight of magnesium based on the weight of the precursor.
5. Ti=the percent by weight of titanium based on the weight of the precursor.
6. Ce=the parts per million of cerium (per million parts by weight of precursor).
7. Temperature=polymerization temperature in °C.
8. Kg/g Ti=the kilograms of catalyst precursor per gram of titanium.
9. Isotactic index=the isotactic index of the propylene homopolymer product. It is determined by weighing a sample of the product and extracting with refluxing heptane for at least 4 hours. The insoluble polymer is thoroughly dried and weighed. The percentage of polymer insoluble under the extraction conditions is reported as the isotactic index.
10. Al/SCA=the molar ratio of aluminum to selectivity control agent.
11. Melt flow is determined under ASTM D-1238, Condition L, measured at 230° C. with a 2160 gram load. It is reported as grams per 10 minutes (g/10 min).

We claim:
1. A catalyst system comprising:
(i) a catalyst precursor, which includes: magnesium; titanium; a halogen, which is chlorine, bromine, or iodine, or a mixture thereof; one or two inside electron donors; and a cerium (IV) compound;
(ii) a hydrocarbylaluminum cocatalyst; and
(iii) a selectivity control agent wherein the atomic ratio of aluminum to titanium is in the range of about 5 to about 300 and the molar ratio of aluminum to selectivity control agent is in the range of about 0.1 to about 100.

2. The catalyst system defined in claim 1, wherein there is one inside electron donor.

3. The catalyst system defined in claim 1 wherein there are two inside electron donors.

4. The catalyst system defined in claim 1 wherein the inside electron donor is a mono- or polycarboyxlic acid ester.

5. The catalyst system defined in claim 1 wherein the molar ratio of inside electron donor to titanium is in the range of about 0.0005:1 to about 2:1.

6. The catalyst system defined in claim 1 wherein the molar ratio of cerium (IV) compound to titanium is in the range of about 0.0001:1 to about 0.09:1.

7. The catalyst system defined in claim 1 wherein at least one inside electron donor is a hydrocarbyl phthalate.

8. The catalyst system defined in claim 7 wherein the hydrocarbyl phthalate is a dialkyl phthalate and each alkyl group has 1 to 20 carbon atoms and is the same or different.

9. The catalyst system defined in claim 1 wherein the cerium (IV) compound is an organic or inorganic salt.

10. The catalyst system defined in claim 9 wherein the cerium (IV) compound is an organic salt.

11. The catalyst system defined in claim 6 wherein the molar ratio of cerium (IV) compound to titanium is in the range of about 0.001:1 to about 0.02:1.

12. The catalyst system defined in claim 8 wherein the dialkyl phthalate is diisobutyl phthalate.

13. The catalyst system defined in claim 10 wherein the cerium (IV) compound is cerium (IV) acetylacetonate.

14. The catalyst system defined in claim 1 wherein the selectivity control agent is a mono- or polycarboxylic acid ester or a silicon compound having at least one silicon-oxygen-carbon linkage.

15. The catalyst system defined in claim 14 wherein the selectivity control agent is a silicon compound having at least one silicon-oxygen-carbon linkage.

16. A catalyst system comprising:
(i) a catalyst precursor, which includes: magnesium; titanium; a halogen, which is chlorine, bromine, or iodine, or a mixture thereof;
(ii) a hydrocarbylaluminum cocatalyst; and
(iii) a selectivity control agent wherein the atomic ratio of aluminum to titanium is in the range of about 5 to about 300; the molar ratio of aluminum to selectivity control agent is in the range of about 0.1 to about 100; the inside electron donor is a mono- or polycarboxylic acid ester; the selectivity control agent is a mono- or poly carboxylic acid ester or a silicon compound having at least one silicon-oxygen-carbon linkage; the cerium (IV) compound is an organic or inorganic salt; the molar ratio of inside electron donor to titanium is in the range of about 0.0005:1 to about 2:1; and the molar ratio of cerium (IV) compound to titanium is in the range of about 0.0001:1 to about 0.09:1.

17. A catalyst precursor comprising: magnesium; titanium; a halogen, which is chlorine, bromine, or iodine, or a mixture thereof; one or two inside electron donors; and a cerium (IV) compound.

18. The catalyst precursor defined in claim 17 wherein there is one inside electron donor.

19. The catalyst precursor defined in claim 17 wherein there are two inside electron donors.

20. The catalyst precursor defined in claim 17 wherein the inside electron donor is a mono- or polycarboxylic acid ester.

21. The catalyst precursor defined in claim 17 wherein the molar ratio of inside electron donor to titanium is in the range of about 0.0005:1 to about 2:1.

22. The catalyst precursor defined in claim 17 wherein the molar ratio of cerium (IV) compound to titanium is in the range of about 0.0001:1 to about 0.09:1.

23. The catalyst precursor defined in claim 17 wherein at least one inside electron donor is an hydrocarbyl phthalate.

24. The catalyst precursor defined in claim 23 wherein the hydrocarbyl phthalate is a dialkyl phthalate and each alkyl group has 1 to 20 carbon atoms and is the same or different.

25. The catalyst precursor defined in claim 17 wherein the cerium (IV) compound is an organic or inorganic salt.

26. The catalyst precursor defined in claim 25 wherein the cerium (IV) compound is an organic salt.

27. The catalyst precursor defined in claim 22 wherein the molar ratio of cerium (IV) compound to titanium is in the range of about 0.001:1 to about 0.02:1.

28. The catalyst precursor defined in claim 24 wherein the dialkyl phthalate is diisobutyl phthalate.

29. The catalyst precursor defined in claim 26 wherein the cerium (IV) compound is cerium (IV) acetylacetonate.

* * * * *